_US006148100A_

United States Patent [19]
Anderson et al.

[11] Patent Number: 6,148,100
[45] Date of Patent: Nov. 14, 2000

[54] 3-DIMENSIONAL TELEPRESENCE SYSTEM FOR A ROBOTIC ENVIRONMENT

[75] Inventors: Matthew O. Anderson; Mark D. McKay, both of Idaho Falls, Id.

[73] Assignee: Bechtel BWXT Idaho, LLC, Idaho Falls, Id.

[21] Appl. No.: 08/996,015

[22] Filed: Dec. 22, 1997

Related U.S. Application Data

[60] Provisional application No. 60/034,264, Dec. 20, 1996.

[51] Int. Cl.[7] .................................................. G06K 9/00
[52] U.S. Cl. ........................ 382/153; 348/211; 700/264; 318/567
[58] Field of Search .................................. 382/103, 107, 382/154, 153; 901/1, 46, 50; 348/211, 113–116, 20, 15, 139, 143, 159, 36, 47, 67; 318/567, 568.1, 568.11, 568.12, 568.13, 628; 345/419, 427, 156–158, 168, 179; 700/245–264, 186

[56] References Cited

U.S. PATENT DOCUMENTS

| | | | |
|---|---|---|---|
| 3,601,530 | 8/1971 | Edson et al. | 348/15 |
| 4,555,592 | 11/1985 | Deinzer | 455/416 |
| 4,985,846 | 1/1991 | Fallon | 382/153 |
| 4,992,866 | 2/1991 | Morgan | 348/159 |
| 5,426,450 | 6/1995 | Drumm | 345/168 |
| 5,436,542 | 7/1995 | Petelin et al. | 318/567 |
| 5,450,596 | 9/1995 | Felsenstein | 708/141 |
| 5,576,727 | 11/1996 | Rosenberg et al. | 345/179 |
| 5,594,859 | 1/1997 | Palmer et al. | 345/330 |
| 5,640,485 | 6/1997 | Ranta | 704/251 |
| 5,684,531 | 11/1997 | Li et al. | 348/139 |
| 5,784,282 | 7/1998 | Abitbol et al. | 700/186 |

*Primary Examiner*—Andrew W. Johns
*Assistant Examiner*—Ishrat Sherali
*Attorney, Agent, or Firm*—Workman Nydegger & Seeley

[57] ABSTRACT

A telepresence system includes a camera pair remotely controlled by a control module affixed to an operator. The camera pair provides for three dimensional viewing and the control module, affixed to the operator, affords hands-free operation of the camera pair. In one embodiment, the control module is affixed to the head of the operator and an initial position is established. A triangulating device is provided to track the head movement of the operator relative to the initial position. A processor module receives input from the triangulating device to determine where the operator has moved relative to the initial position and moves the camera pair in response thereto. The movement of the camera pair is predetermined by a software map having a plurality of operation zones. Each zone therein corresponds to unique camera movement parameters such as speed of movement. Speed parameters include constant speed, or increasing or decreasing. Other parameters include pan, tilt, slide, raise or lowering of the cameras. Other user interface devices are provided to improve the three dimensional control capabilities of an operator in a local operating environment. Such other devices include a pair of visual display glasses, a microphone and a remote actuator. The pair of visual display glasses are provided to facilitate three dimensional viewing, hence depth perception. The microphone affords hands-free camera movement by utilizing voice commands. The actuator allows the operator to remotely control various robotic mechanisms in the remote operating environment.

29 Claims, 5 Drawing Sheets

Microfiche Appendix Included
(2 Microfiche, 124 Pages)

3-DIMENSIONAL TELEPRESENCE SYSTEM FOR A ROBOTIC ENVIRONMENT

RELATED APPLICATION

This application claims priority from provisional application Ser. No. 60/034,264 filed Dec. 20, 1996.

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

BACKGROUND OF THE INVENTION

1. Field of the Invention

The present invention relates generally to remotely controlled robotic systems. More specifically the present invention relates to a telepresence system having improved 3-dimensional controlling capabilities particularly useful in a HAZMAT environment.

2. Copyrighted Materials

A portion of the disclosure of this patent document contains materials to which a claim of copyright protection is made. The copyright owner has no objection to the reproduction by anyone of the patent document or the patent disclosure as it appears in the Patent and Trademark Office patent file or records, but reserves all other rights with respect to the copyrighted work.

RELEVANT TECHNOLOGY

Robots and robotic systems are increasingly being implemented as solutions to problems in environments that are hazardous to humans. For example, robotic systems are routinely used in underwater operations to observe and inspect sunken vessels. This alleviates the problem of depriving humans of oxygen for extended periods of time. This also alleviates the problem of exposing humans to intense underwater pressures.

Other hazardous environments beneficially enjoying robotics includes sites having hazardous materials (HAZMAT) and/or unexploded ordinance. With robotics, these dangerous sites are provided with remote HAZMAT clean-up or ordinance defusal without unnecessarily exposing humans to life-threatening radioactivity or explosives.

Although beneficial, robots and their accompanying systems have increasingly become more intricate and complex. In fact, robotic systems useful for cleaning up HAZMAT sites have become so intensely complicated that single operators are frequently overwhelmed by the large number of controls at the "man-machine" interface. Many of the latest systems now require multiple operators to control them.

The use of multiple operators, however, causes compromise. For example, multiple operators are frequently required to coordinate their individual actions to produce a singular result. Since the operators are separated and often control devices requiring their focus and hands to remain on those devices, effective communications between operators is hampered. Often, communications between operators is relegated to a confusing clamor of commands back and forth between one another.

HAZMAT robotic systems also suffer from problems associated with each individual component of the system. For example, some HAZMAT robotic systems have incorporated video cameras in the vicinity of the robotic mechanisms, commonly known as "telepresence," to assist in assimilating the human operator into the HAZMAT site. The HAZMAT site is often hundreds of feet away from the human operators and separated by various radioactive barriers. Thus, the camera becomes the "eyes" of the operator. Yet, if the camera is a singular unit, 3-dimensional viewing capability is non-existent. This leaves the operator without depth perception. Detrimentally, lack of depth perception can sometimes cause the controller of the robotic mechanism to catastrophically destroy objects within the remote HAZMAT site.

Videos cameras are also problematic because of their control mechanisms. For example, the ultimate robotic response might be to seal HAZMAT materials in an appropriate contamination container. Because the operator must, typically, dually maneuver both the camera to "see" the HAZMAT materials and maneuver the robotic mechanism to grasp and seal the materials, the operation becomes cumbersome and slow. An operator has, heretofore, been unable to effectively perform both functions at once. Although some video camera movements are operated with "hands-free" controls, such as headgear, these video camera movements can cause disorientation of the operator. For example, every time the head of the operator moves, the camera follows in "real time" response thereto. Unless the operator can keep their head substantially still, the camera will "twitch" with even the slightest of head movements. This constant twitching causes blurred video images to be displayed on remote monitors and, hence, potentially disorients the operator.

Another problem with video cameras in the HAZMAT robotic environment is the lack of "zooming" in on a desired object in the remote site. Although single camera units are known that can "zoom," 3-dimensional viewing is, again, non-existent with conventional singular camera platforms.

Accordingly, it would be an advance to improve the telepresence remote-control capabilities in a HAZMAT robotic environment.

SUMMARY AND OBJECTS OF THE INVENTION

It is, therefore, an object of the present invention to provide an improved telepresence system for use in a remote robotic environment providing visual depth perception to the operator.

It is another object of the present invention to provide an improved telepresence system for use in a remote robotic environment providing "hands-free" camera platform control.

It is a further object of the present invention to provide an improved telepresence system for use in a remote robotic environment eliminating the requirement for multiple system operators.

It is yet another object of the present invention to provide an improved telepresence system for use in a remote robotic environment providing means for getting visually closer to a desired object without having to switch between various camera platforms.

It is still another object of the present invention to provide an improved telepresence system for use in a remote robotic environment substantially eliminating disorienting effects to the operator during positioning of the camera platforms.

It is a concomitant object of the present invention to provide an improved telepresence system for use in a remote robotic environment substantially eliminating communication confusion when attempting to achieve a desired robotic result.

In accordance with the invention as embodied and broadly described herein, the foregoing and other objectives are achieved by providing a camera pair remotely controlled by a control module affixed to an operator. The camera pair or apparatus used therewith provides for three dimensional viewing and the control module, affixed to the operator, affords hands-free operation of the camera pair.

In a preferred embodiment, the control module is affixed to the head of the operator and an initial position is established. A triangulating device is provided to track the head movement of the operator relative to the initial position. A processor module receives input from the triangulating device to determine where the operator has moved relative to the initial position and moves the camera pair in response thereto. The movement of the camera pair is predetermined by a software map having a plurality of operation zones. Each zone therein corresponds to unique camera movement parameters such as speed of movement. Speed parameters include constant speed, or increasing or decreasing. Other parameters include pan, tilt, slide, raise or lowering of the cameras.

Other user interface devices are provided to improve the three dimensional control capabilities of an operator in a local operating environment. Such other devices include a pair of visual display glasses, a microphone and a remote actuator. The pair of visual display glasses are provided to facilitate three dimensional viewing, hence depth perception. The microphone affords hands-free camera movement by utilizing voice commands. The actuator allows the operator to remotely control various robotic mechanisms in the remote operating environment.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above- recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

Figure 1:
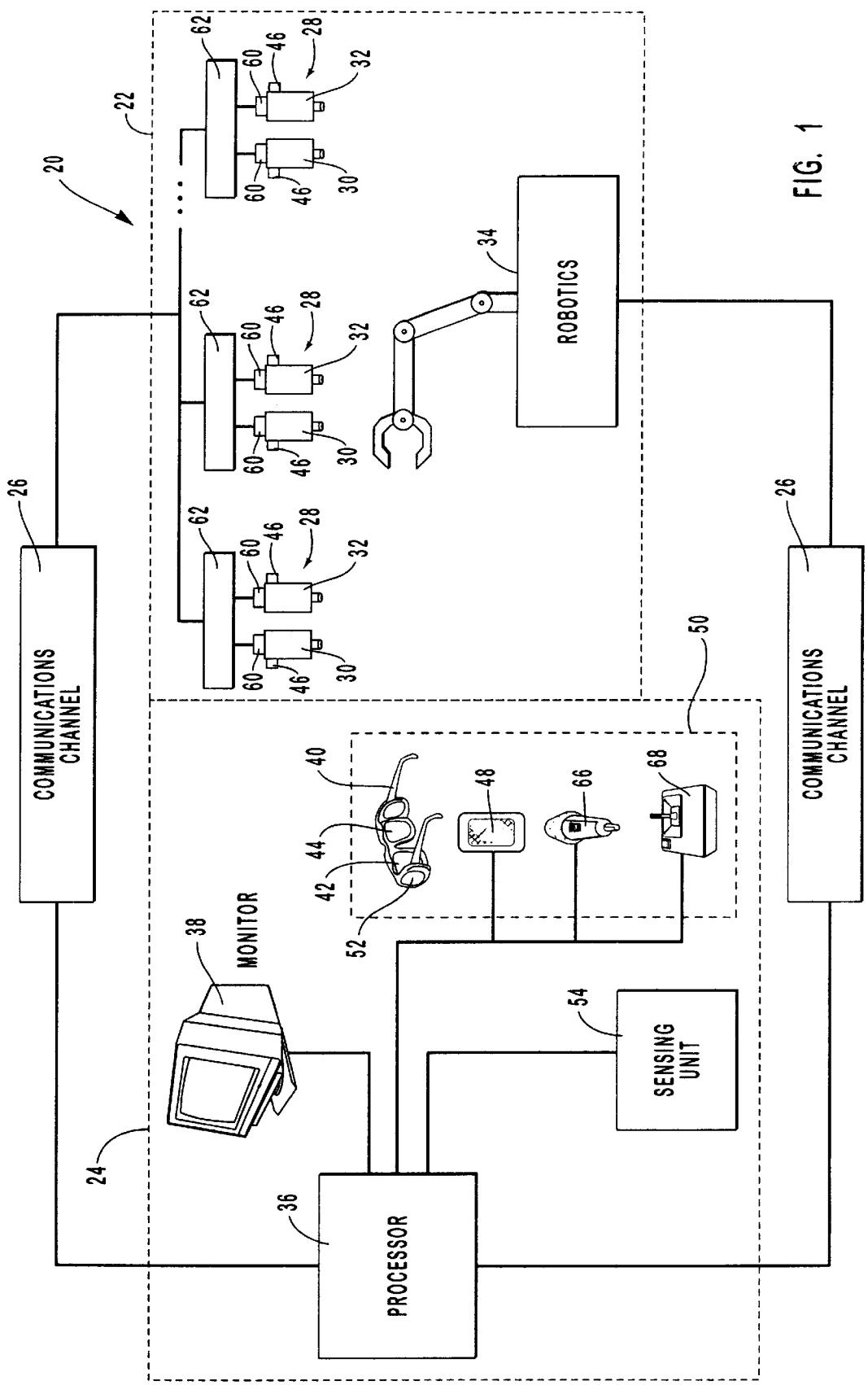
FIG. 1 is an exemplary diagram of an improved telepresence system particularly useful in a HAZMAT robotic environment in accordance with the present invention.

The present invention relates to a telepresence system having improved three dimensional (3-D) controlling capabilities particularly useful in a HAZMAT robotic environment. With reference to FIG. 1, an exemplary telepresence system in accordance with the present invention is depicted generally as 20. The system 20 is useful for safely separating human operators from a hazardous environment while still allowing the operators to control devices within the hazardous environment. Such environments are well known and include, but are not limited to, underwater sites, HAZMAT sites, unexploded ordinance sites, surgical suites and remote inspection sites. In context, the system 20 of the present invention will be described in terms of a preferred environment, the HAZMAT site.

The portion of the HAZMAT site having the hazardous materials is part of the system 20 which will be referred to as a remote operating environment 22. The portion where an operator is safely isolated from the remote operating environment will be referred to as a local operating environment 24. Although the two operating environments 22 and 24 are physically separated, both environments are connected by a communications channel 26. The communications channel 26 allows the operator in the local operating environment 24 a means for remotely controlling operations within the remote operating environment. The communication channel 26 preferably consists of a tether housing various electrical, mechanical and electromechanical communication devices. Alternatively, the communications may be a wireless communication channel having a transmitting and receiving end at both of the operating environments. The communications channel 26 may also be any other means for providing remote system control.

For the operator to remotely control operations, it is necessary to provide a means for the operator to acquire visual images within the remote operating environment. The visual images are acquired by a camera or, more preferably, at least one camera pair 28. Preferably the camera pairs are configured as a left camera 30 and a right camera 32 at strategic locations within the remote operating environment 22. In a HAZMAT site, such as a defunct nuclear reactor, one preferable camera pair location includes a position directly above the reactor. Another preferred camera pair location includes a vantage point showing the full range of mechanical motion of a remotely controlled robotic mechanism 34. Camera pairs 28 successfully employed in the system 20 of the present invention have included Sony XC999 cameras.

Relaying the visual image obtained by the camera pairs 28 in the remote operating environment 22 to the local operating environment 24 is the communication channel 26. In one embodiment, once the visual image is relayed to the local operating environment 24, a processor 36 converts the visual image into a three dimensional (3-D) interpretation thereof. The processor 36 may include software, hardware or combinations thereof. Frequently, the processor 36 is part of a larger computing environment having a central processing unit, a keyboard for data entry, and magnetic storage devices such as a local or remote hard drive. In one embodiment, operating environment 24 can include an Ampro Littleboard 486i embedded system. The Little board provides a 486 processor, four com ports, SVGA video with built-in CRT/LCD controller, PC104 expansion, and a PC/AT expansion bus. An LCD with back lighting can be used to display commands to and from the embedded controller.

The image interpreted by the processor 36 is displayed on a visual display unit (VDU) 38 so the operator can "see" into the remote operating environment. One example of display unit 38 is a 21" stereo ready high resolution monitor.

Although some VDU's 38 are capable of directly displaying 3-D images directly on their screen, it has been observed that 3-D resolution can be vastly improved by wearing visual display glasses 40. The visual display glasses 40 are part of the user interface environment 50 that facilitates improved assimilation of the operator into the remote operating environment 22. It should be appreciated that the prior art problem of depth perception within the remote operating environment 22 is not only overcome by providing a camera pair 28 but is even further improved by 3-D visual display glasses 40. One preferred 3-D resolution system providing high resolution is the Crystal Eyes VR system sold by Stereo Graphics Corp. Such systems can include a stereo ready high resolution monitor, triangular head tracking transmitter, VR head tracking glasses, infrared emitter for synchronization of the glasses, and view/record processor.

In one embodiment utilizing Crystal Eyes, each visual image obtained by the left and right cameras 30 and 32 are respectively cycled between a left lens 42 and a right lens 44 of the visual display glasses 40 at a rate of 60 Hz. The VDU 38 cooperates well with this lens cycling at a 120 Hz vertical scan rate.

It should be appreciated that the visual imaging in the remote operating environment 22 is even further improved by spacing the left and right cameras 30 and 32 in a centerline to centerline distance of about 2 to about 3 inches apart. In this manner, the visual images are obtained, interpreted, and displayed at a separation distance comparable to the spaced distance of the human eyes. To further improving the assimilation of the operator in the local operating environment 24 into the remote operating environment 22, a pair of spaced apart microphones 46 can be used. The microphones are proximately spaced about the camera pair 28 in a spaced relationship that approximates the spacing between each human ear and the spacing between the human ears and the human eyes. In this manner, the operator perceives visual and audio images of the remote operating environment in a manner representative of the manner in which an actual human operator would see and hear if able to be within the remote operating environment. The operator receives the audio images of the remote operating environment 22 on a speaker 48 located in the user interface environment 50.

The operator controls what they "see" in the remote operating environment 22 by moving the camera pairs 28 therein. In general, movement of the camera pairs is in a "mapped" response to the movement of the head of the operator. The mapped response is either a software or hardware map, described below, that is predetermined to alter the camera pairs along 3-D axises depending upon how much movement of the head of the operator is sensed. Once sensed, however, alteration of the camera pairs 28 is accomplished via a pan and tilt device 60 and a sliding track 62. In this embodiment, the pan and tilt device 60 allows 3-D camera orientation in each of the X, Y and Z axises. The panning function and the tilting function of the pan and tilt device 60 serve to either pan or tilt the camera pair in a single two dimensional plane, together the two functions serve to three dimensionally move the camera pairs. The sliding a track 62 allows 3-D movement by physically bringing the camera pair 28 closer to various objects within the remote operating environment along a track having track sections in each of the X, Y and Z axises. It is contemplated that the sliding track 62 can be configured within remote operating environment 22 along walls or floors thereof or even along portions of the robotic mechanism 34. It is even contemplated that an extending actuator 64 can be used to raise and lower the camera pair 28 at various desired locations along the sliding track 62. Thus, it should be appreciated that the sliding track and any extending actuators will bring viewed objects visually closer to the operator and overcome the limitations within the prior art to zoom in on an object.

Sensing head movement of the operator for the purposes of mapping a responsive movement of the camera pairs 28 is a sensing unit 54. The sensing unit 54 is preferably a tele-geometric/triangulating device capable of three dimensionally enabling the tracking of parameters of the operator such as when, how far and in what direction the control module attached to the operator has moved. Such devices can include, but are not limited to, combinations of transmitter/receiver pairs in various frequency spectrums. Infrared tracking devices can also be used. In one embodiment, head tracking is accomplished by attaching a control module 52, such as a microphone, to the visual display glasses 40 worn by the operator. When the head of the operator moves, the control module moves and the sensing unit detects the movement.

Once head movement is detected, the mapped movement response of the camera pair is coordinated by means of the processor 36. The processor 36 may, but is not required to be, the same processor as the one for converting the visual image into a 3-D interpretation for display on the VDU 38.

From the above, it should be appreciated that the present invention allows not only for a 3-D view of the remote operating environment for depth perception purposes, but also for a "hands-free" operation of the camera pairs therein. Thus, the problem of cumbersome control switches hampering a free flowing operation of the cameras is alleviated. This method of operation also substantially eliminates any requirement for more than a single operator in the local operating environment 24. Consequently, there is no longer a requirement for one operator to operate the cameras and another operator to operate the robotic mechanisms in the remote environment. Potential confusion of voicing commands between various operators is eliminated.

It should be appreciated that alternatives exist for the various discrete components described above. For example, the control module 52 can be positioned on the head or any other human body part or clothing facilitating a hands-free operation. Another alternative includes the use of multiple VDU's assembled to correspond in number to each camera pair obtaining a visual image in the remote operating environment. It is also contemplated that a singular VDU can be used for all the camera pairs with a multiplexing means for switching the video between the camera pair actively being used at a particular time. Preferably, various voice commands issued by the operator can be used to accomplish the switching.

In one embodiment, a microphone 66 in the user interface environment 50 is for the operator to issue voice commands. The processor 36 then interprets the commands with software, for example, to switch between the camera pairs and produce the visual image on the VDU 38. For convenience, the microphone may be mounted to the visual display glasses 40 or be free-standing to provide for additional hands-free operation.

It should be appreciated, however, that the software used to recognize the voice commands should be "pseudo-intelligent." The voice command software should be able to distinguishes between sound or noise and specific voice command words. In this manner, inadvertent camera pair movement is prohibited while the operator is talking or moving about. By way of example and not by limitation, the Dragon VoiceTools available from Dragon System's Inc. can be used with a sound card to listen for valid commands from the user and then process the corresponding commands.

Specific commands contemplated are "one" for the first camera pair, "two" for the second camera pair and so on. Other voice commands are useful in combination with the voice processing software to achieve even further hands free operations. Such specific other commands include: "pause" to stop movement of the camera pair on the sliding track and update the LCD lenses of the visual display glasses; "go" to begin any paused operations; "calibrate" for initializing the map to various operators; "home" for positioning the camera pair at a predefined location; "stereo" to display a stereo visual image on the VDU; "mono" for showing a mono visual image on the VDU; "version" to show the operator the latest software version being used; or any other similarly useful voice commands or command sequences.

Based upon what an operator "sees" in the remote operating environment 22, the operator is able to adjust the robotic mechanisms 34 within the remote operating environment 22 to achieve specific desired results. In a HAZMAT environment, desired results include the dismantling of reactors and cleaning surfaces. In a preferred embodiment, the robotic mechanism 34 is controlled by the operator with an actuator 68 located in the user interface environment 50. The actuator 68 is preferably a 6 degree of freedom (DOF) device moving the robotic mechanism in the x, y, z, yaw, pitch and roll axises. Other possible actuators include, but are not limited to, a flying mouse and datagloves both well known in the art.

Figure 2:
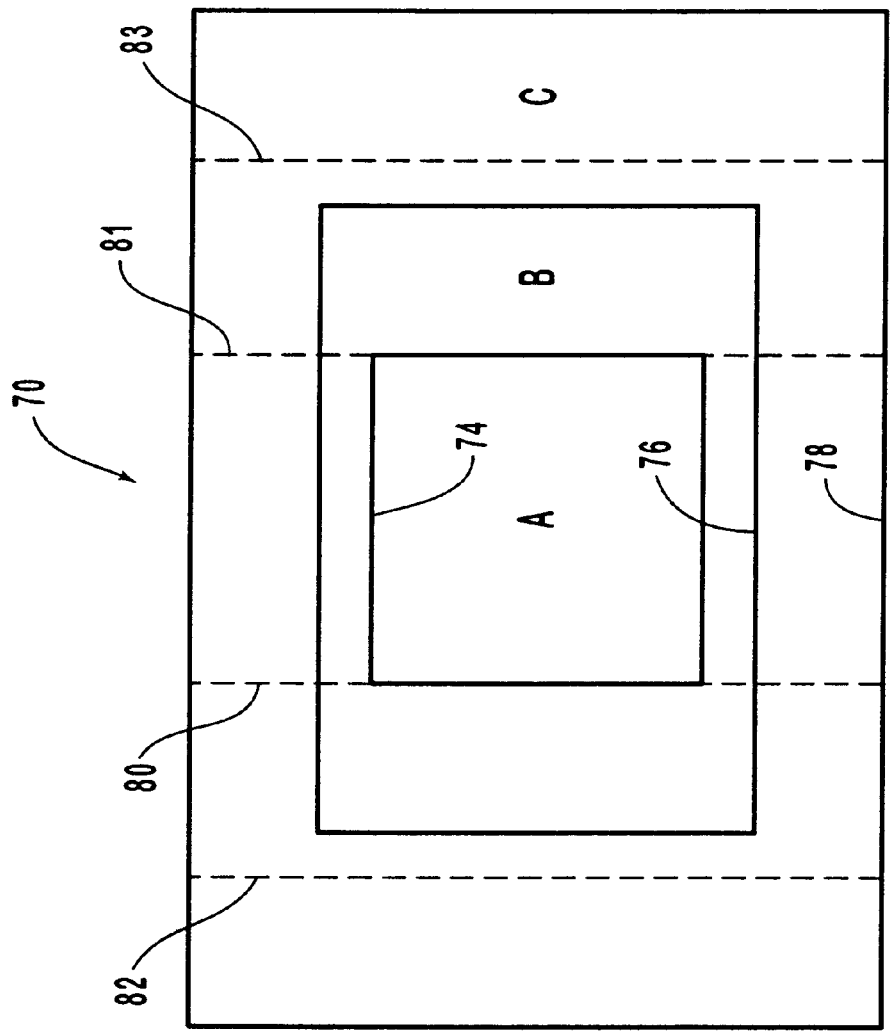
FIG. 2 is an exemplary diagram of a map having a plurality of operation zones for providing a hands-free control of a three dimensional visual imaging platform of an improved telepresence system in accordance with the present invention.

With reference to FIG. 2, the map for interpreting the mapped response of the camera pair in response to movement of the control module will now be described. As before, the map 70 can either be a software or a hardware designated map. In this embodiment it is a software map have a plurality of operation zones. The preferred operation zones include a dead zone 74, an intermediate zone 76, an edge zone 78, a left inner zone 80, a right inner zone 81, a left outer zone 82 and a right outer zone 83. In general, the zones correspond to how the "active" camera pair 28 will move or be oriented when it is determined by the sensing unit that the control module corresponds to a particular operation zone. The active camera pair is defined as the camera pair providing the visual image on the VDU 38 at any particular time.

The operation zones can be established to move the active camera pair in a variety of ways. To particularly describe one preferred embodiment, the movement of the active camera pair along the sliding track 62 will be described. It should be understood that the zones are equally applicable to the other types of movement of the active camera pair. Such other types include, but are not limited to, the panning or tilting of the camera pair corresponding to the action of the pan and tilt device 60 or the up and down movement of the active camera pair corresponding to action of the extending actuators 64.

The dead zone 74 corresponds to a substantially stationary active camera pair and is the zone first established during the initialization of the map. For example, during use when an operator dons the control module 52, i.e., visual display glasses 40, the operator positions themself to a neutral position and voice commands the processor module 36 to "calibrate." The processor then defines the head position of the operator to be an initial position and the dead zone is defined in distances therefrom. In one embodiment, the dead zone equates to a square area with each side of the square being about 8 inches of head movement with the initial position being located in the center of the square.

Thereafter, based upon stored data, the remaining operation zones are defined by the map in distances from the dead zone 74. In turn, the operation zones correspond to a movement of the camera pair. In this example, the left and right inner zones 80 and 81 and the left and right outer zones 82 and 83 all correspond to moving the active camera pair along the sliding track. In general, a left zone refers to leftward movement of the camera pair along the sliding track. A right zone refers to rightward movement of the camera pair along the sliding track. All leftward and rightward movement is relative to the initial position of the control module 52 (head position). For different operators, a new map is defined. The difference between the inner zones and the outer zones is a variance in a movement parameter such as the speed of travel of the camera pair and/or type of camera movement, i.e., pan, tilt, slide. Each zone has its own unique movement parameters.

Thus, if the sensing unit 54 detects that the control module 52 is in the dead zone 74, the sensing unit will convey that information to the processor 36 and the processor 36 will command the camera pair to remain stationary. When the operator moves their head to the left about 10 inches, for example, the sensing unit detects that the control module has moved left. In turn, the sensing unit conveys to the processor 36 that the control module moved 10 inches leftward. The processor 36 then equates 10 inches of left head movement to the left inner zone 80 and commands the camera pair to move leftward on the sliding track in accordance with the movement parameters of that zone. The active camera pair then slides on the sliding track 62 to the left at a predetermined speed, for example.

When the operator desires to stop moving the camera pair, as dictated by what the operator views on the VDU 38, the operator simply moves his head (control module 52) back towards the right until the camera pair stops moving. This means that the control module 52 again corresponds to the dead zone 74. If the operator desires to move the camera pair a greater distance of travel and wants to do so quickly, the operator merely moves their head from the dead zone 74 farther to the left or right so that the processor equates the distance of head travel to one of the left or right outer zones 82 or 83. Advantageously, this method of moving the camera pairs has been found to be natural and problematic disorientation of the operator is alleviated. It should be appreciated that with this method of moving the camera pair an operator is free to concentrate on other various tasks, especially control of the robotic mechanisms 34.

It should be further appreciated that each operation zone can be configured with various other movement parameters. Such parameters include, but are not limited to, a constant speed of movement in each zone. Camera pair orientation may even be mapped such that the speed of travel in each zone is increasing or decreasing the further the head (control module) is moved in relation from the dead zone. Even further mapping may include combinations of orientation parameters. These exemplary parameters include operation zones having all three methods of movement such as pan, tilt, and slide, two methods of movement plus a particular or variable speed of travel. Still other combinations of movement parameters are envisioned and embraced as being within the scope of this invention.

To establish the dead zone for each individual operator, hence the map center, an initialization operation can be performed. Such initialization can be another voice command, such as "re-calibrate," or can be a keyboard entry provided directly to the processor. Whatever the initialization, once initialized, the map has a center and known distances therefrom equate as a mapped function of how far and how fast the active camera pair will move.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Figure 3:
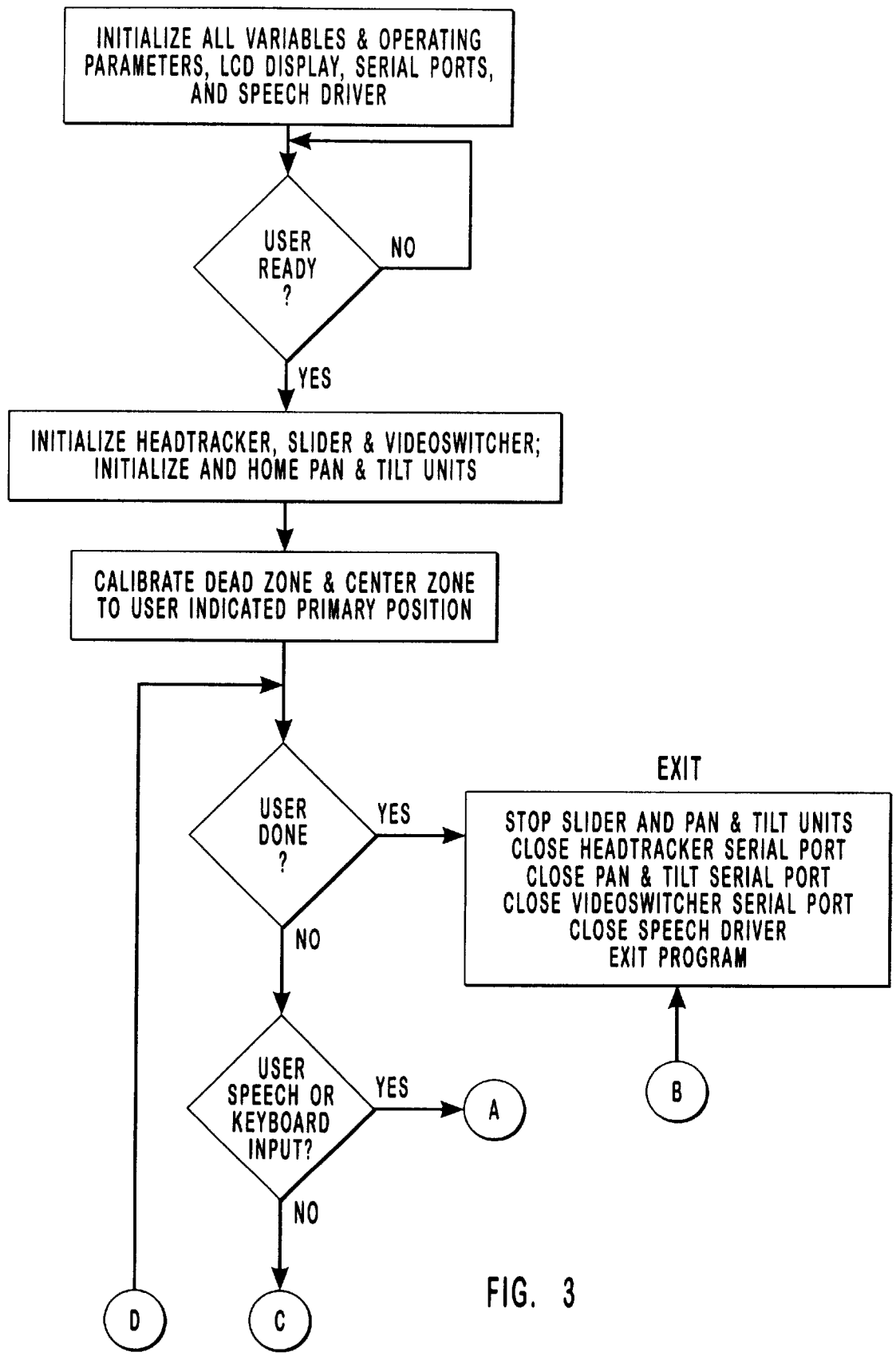
FIGS. 3–5 are functional block diagrams of the source code attached as microfiche appendix, Appendix A.
Figure 4:
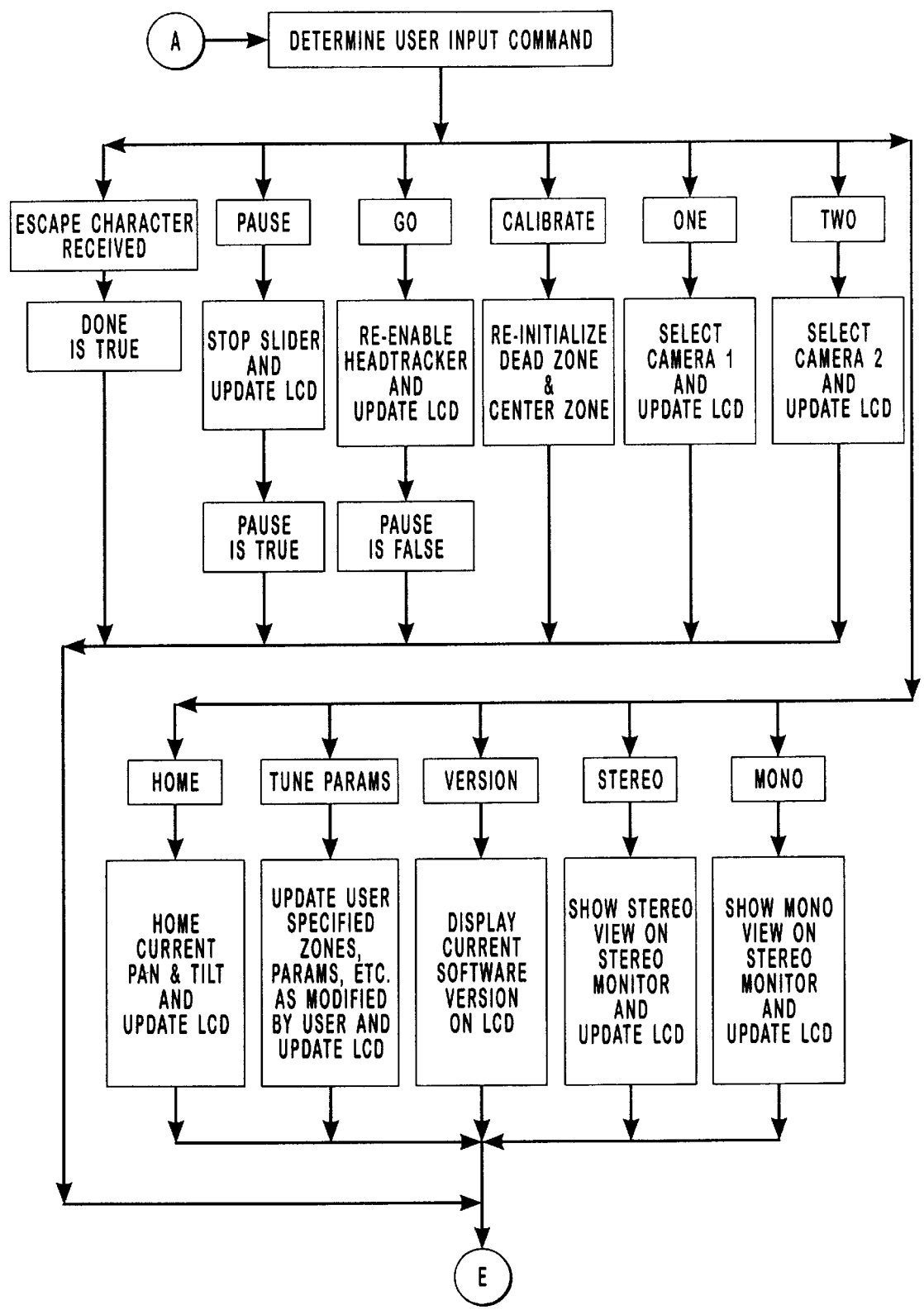
Figure 5:
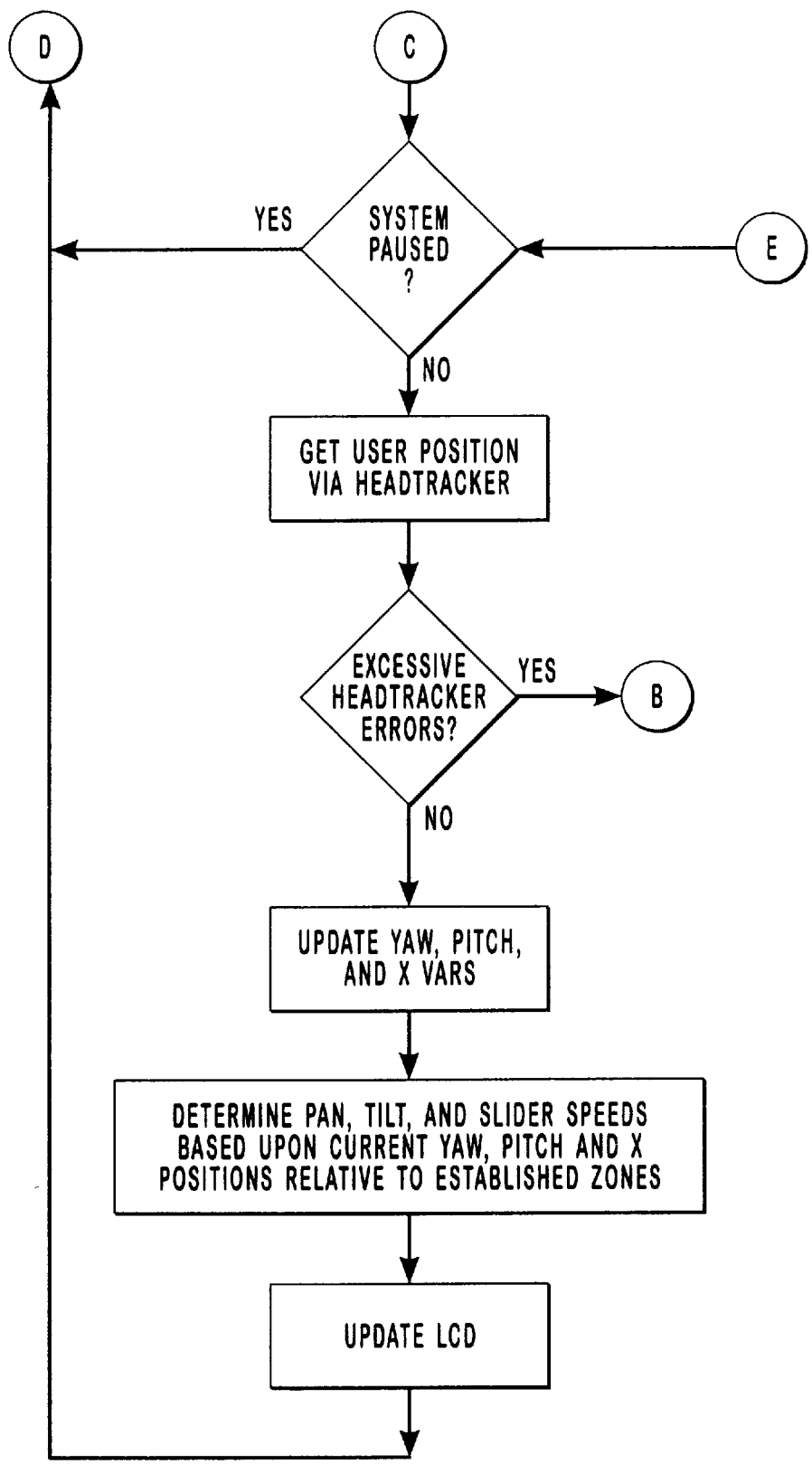

As in the case of alternative embodiments, the processor 36 could be 9 programmed in a variety of programming languages and techniques so as to implement the above described map 70. In accordance with one embodiment of the present invention, attached hereto, as Appendix A, is one example of a program which has been prepared for use with the processor 36 to implement the map 70. The appended program comprises a listing of source code and assembly language for the processor. FIGS. 3–5 depict a functional block diagram of how the source code operates.

We claim:

1. A telepresence system for assisting in assimilating an operator in a local operating environment into a remote operating environment, the system comprising:
   (a) a camera assembly comprising a pair of adjacently disposed cameras to obtain a visual image in three dimensions;
   (b) means for orienting the camera assembly;
   (c) a visual display unit configured to receive and display the visual image from the camera assembly;
   (d) means for enabling the operator to view the visual image on the visual display unit in three dimensions;
   (e) a control module configured for attachment to the operator;
   (f) a triangulating device configured to receive signals from the control module; and
   (g) a processor module configured to receive signals from the sensing unit and transmit signals to the means for orienting the camera such that the camera is oriented in response to the operators movement.

2. A telepresence system according to claim 1, wherein the means for orienting the camera assembly comprises a pan and tilt device.

3. A telepresence system according to claim 1, wherein the means for orienting the camera assembly comprises a sliding track.

4. A telepresence system according to claim 1, wherein the means for enabling the operator to view the visual image on the visual display unit in three dimensions comprises a pair of visual display glasses.

5. A telepresence system according to claim 4, wherein the visual display glasses have a right and left lens thereof and the visual image is cycled between the lenses.

6. A telepresence system according to claim 1, wherein the triangulating device comprises a plurality of microphones.

7. A telepresence system according to claim 1, further comprising:
   (a) a robotic mechanism configured for operation in the remote operating environment; and
   (b) an actuator configured to enable the user viewing the visual display to control the robotic mechanism.

8. A telepresence system according to claim 1, further comprising a pair of stereo microphones mounted to the camera assembly.

9. A telepresence system according to claim 1, further comprising:
   (a) a plurality of camera pairs; and
   (b) means for switching between activation of the camera paris by voice command.

10. A telepresence system for assisting in assimilating an operator in a local operating environment into a remote operating environment, the system comprising:
    (a) a camera assembly configured to obtain a visual image in the remote operating environment;
    (b) means for orienting the camera assembly using a select combination of movement parameters, the movement parameters including speed of camera movement and type of camera movement;
    (c) a visual display unit configured to receive and display an interpretation of the visual image from the camera assembly;
    (d) means for enabling tracking of the relative movement of the operator as the operator views the visual display; and
    (e) a processor being configured to:
       (i) initialize an initial position of the operator based on inputs received by the processor from the means for enabling tracking;
       (ii) establish a map including a plurality of operation zones, the zones corresponding to regions in which the operator can move, the zones being positioned relative to the initial position of the operator;
       (iii) receive inputs from the means for enabling tracking to ascertain the coordinates and corresponding zone of the operator as the operator moves while viewing the visual display; and
       (iv) transmit signals to the means for orienting the camera, the signals defining the select combination of movement parameters for the camera, the select combination of movement parameters being unique for each of the plurality of operation zones.

11. A telepresence system according to claim 10, wherein the camera assembly comparises a pair of adjacently disposed cameras.

12. A telepresence system according to claim 10, wherein the means for orienting the camera assembly comprises a pan and tilt device.

13. A telepresence system according to claim 10, further comprising means for enabling the operator to view the visual image on the visual display unit in three dimensions.

14. A telepresence system according to claim 10, wherein the means for enabling tracking comprises:
    (a) a control module configured for attachment to the head of the operator; and
    (b) a triangulating device configured to receive signals from the control module.

15. A telepresence system according to claim 10, further comprising:
    (a) a robotic mechanism configured for operation in the remote operating environment; and
    (b) an actuator configured to enable the user viewing the visual display to control the robotic mechanism.

16. A telepresence system according to claim 10, wherein the plurality of operation zones comprises a first zone wherein the camera assembly remains stationary during movement of the operator in the region corresponding to the first zone.

17. A telepresence system according to claim 10, wherein the plurality of operation zones comprises a second zone wherein the camera assembly can pan and tilt at a first predetermined speed when the operated is in the region corresponding to the second zone.

18. A telepresence system according to claim 17, wherein the plurality of operation zones comprises a third zone wherein the camera assembly can pan and tilt at a second predetermined speed faster than the first predetermined speed when the operated is in the region corresponding to the third zone.

19. A telepresence system for assisting in assimilating an operator in a local operating environment into a remote operating environment, the system comprising:
   (a) a camera pair configured to obtain a visual image in the remote operating environment;
   (b) a pan and tilt device mounted to the camera pair;
   (c) a sliding track having the camera mounted thereto, the sliding track being configured to move the camera pair along the length thereof;
   (d) a visual display unit configured to receive and display the visual image from the camera pair;
   (e) a control module configured for attachment to the operator;
   (f) a triangulating device configured to receive signals from the control module;
   (g) a processor being configured to:
      (i) initialize an initial position of the operator based on inputs received by the processor from the triangulating device;
      (ii) establish a map including a plurality of different zones, the zones corresponding to regions in which the operator can move, the zones including a first zone, a second zone, and a third zone, the zones being positioned relative to the initial position of the operator;
      (iii) receive inputs from the triangulating device to ascertain the coordinates and corresponding zones of the operator as the operator moves while viewing the visual display unit;
      (iv) transmit signals to the pan and tilt device for moving the camera along a path at a predetermined speed when the operator is in the second zone; and
      (v) transmit signals to the sliding track for moving the camera therealong when the operator is in the third zone.

20. A telepresence system according to claim 19, further comprising means for enabling the operator to view the visual image on the visual display unit in three dimensions.

21. A telepresence system according to claim 19, further comprising:
   (a) a robotic mechanism configured for operation in the remote operating environment; and
   (b) an actuator configured to enable the user viewing the visual display to control the robotic mechanism.

22. A telepresence system according to claim 19, further comprising:
   (a) a plurality of camera pairs; and
   (b) means for switching between activation of the camera paris by voice command.

23. A telepresence system according to claim 19, wherein the camera pair remains stationary during movement of the operator in the region corresponding to the first zone.

24. A method for operating a processor as part of a telepresence system, the telepresence system further including a camera assembly configured to obtain a visual image, the camera being movable by a means for orienting the camera under a select combination of movement parameters, the movement parameters including speed of camera movement and type of camera movement, a visual display unit configured to receive and display the visual image from the camera, a control module configured for attachment to the operator, and a triangulating device configured to receive signals from the control module, the method comprising the steps of:
   (a) initializing a coordinate system based on an initial position of the operator, the initial position being based on inputs received from the triangulating device;
   (b) establishing a map including a plurality of different zones, the zones corresponding to regions in which the operator can move, the zones being positioned relative to the initial position of the operator;
   (c) receiving inputs from the triangulating device to ascertain the coordinates and corresponding zone of the operator as the operator moves while viewing the visual display unit; and
   (d) transmitting signals to the means for orienting the camera, the signals defining the select combination of movement parameters for the camera, the select combination of movement parameters being unique for each of the plurality of zones.

25. A method according to claim 24, further comprising the step of receiving voice command inputs to alter various system parameters.

26. A method according to claim 24, further comprising the step of receiving inputs from an actuator device for controlling movement of a robotic mechanism in a remote operating environment.

27. A method according to claim 24, wherein the step of transmitting signals to the means for orienting the camera comprises the step of transmitting a signal to slide the camera along the track.

28. A method according to claim 24, further comprising the step of transmitting an audio signal received from a remote operating environment to the operator in a local operating environment to facilitate assimilation of the operator into the remote operating environment.

29. A method according to claim 24, wherein the method steps are recorded on a computer readable medium.

* * * * *